United States Patent
Muller-Frischinger

(10) Patent No.: US 7,786,223 B2
(45) Date of Patent: Aug. 31, 2010

(54) EPOXY RESIN AND CURING AGENT OF DI- AND/OR MONO-GLYCIDYETHER/MONOAMINE-POLYAMINE REACTION PRODUCT

(75) Inventor: Isabelle Marie Marguerite Muller-Frischinger, Riespach (FR)

(73) Assignee: Huntsman International LLC, The Woodlands, TX (US)

( * ) Notice: Subject to any disclaimer, the term of this patent is extended or adjusted under 35 U.S.C. 154(b) by 222 days.

(21) Appl. No.: 12/161,980

(22) PCT Filed: Jan. 23, 2007

(86) PCT No.: PCT/EP2007/050655

§ 371 (c)(1),
(2), (4) Date: Jul. 24, 2008

(87) PCT Pub. No.: WO2007/085598

PCT Pub. Date: Aug. 2, 2007

(65) Prior Publication Data

US 2009/0036582 A1 Feb. 5, 2009

(30) Foreign Application Priority Data

Jan. 24, 2006 (EP) .................... 06100767

(51) Int. Cl.
- C08G 59/50 (2006.01)
- C08G 59/56 (2006.01)
- C08L 63/00 (2006.01)
- C08L 63/02 (2006.01)

(52) U.S. Cl. ............ 525/523; 525/481; 525/486; 528/120

(58) Field of Classification Search .......... None
See application file for complete search history.

(56) References Cited

U.S. PATENT DOCUMENTS

| | | | |
|---|---|---|---|
| 4,127,514 A | * | 11/1978 | Waddill ............ 528/93 |
| 4,225,478 A | | 9/1980 | Hicks et al. |
| 4,704,437 A | | 11/1987 | Kiessling et al. |
| 4,992,516 A | * | 2/1991 | Schipfer et al. ............ 525/526 |
| 6,410,658 B1 | | 6/2002 | Schrotz et al. |
| 2005/0176899 A1 | | 8/2005 | Volle |

FOREIGN PATENT DOCUMENTS

| | | |
|---|---|---|
| DE | 271819 | 9/1989 |
| EP | 1136509 | 9/2001 |
| GB | 806196 | 12/1958 |
| JP | 63-178123 A * | 7/1988 |
| JP | 63178123 | 7/1988 |
| JP | 3-79625 A * | 4/1991 |
| WO | WO 03/093342 | 11/2003 |

* cited by examiner

*Primary Examiner*—Robert Sellers
(74) *Attorney, Agent, or Firm*—Robert Holthus

(57) ABSTRACT

A curable composition comprising
a) an epoxy resin containing on average more than one epoxy group per molecule, and
b) as curing agent a composition comprising
b1) 40-100 wt % of a reaction product from the reaction of
b1a) at least one diglycidyl- and/or at least one monoglycidylether with
b1b) a composition comprising a volatile monoamine and a polyamine,
said composition b1b) is used in an amount to provide an excess amino groups relative to epoxy groups from b1a), and whereby the excess of monoamine is removed off from the reaction product,
b2) 0-60 wt % of a polyamine, and
b3) 0-25 wt % of a polyphenol novolac,
and whereby the sum of components b1), b2) and b3) is 100 wt %,
providing long pot life combined with fast cure times at low temperatures,
thus making said compositions especially useful for marine and offshore coatings, industrial maintenance, construction, tank and pipe linings, adhesive, automobile and electrical potting applications.

12 Claims, No Drawings

EPOXY RESIN AND CURING AGENT OF DI- AND/OR MONO-GLYCIDYETHER/MONOAMINE-POLYAMINE REACTION PRODUCT

CROSS REFERENCE TO RELATED APPLICATIONS

This application is the National Phase of International Application PCT/EP2007/050655 filed Jan. 23, 2007 which designated the U.S. and which claims priority to European Patent Application (EP) 06100767.0 filed Jan. 24, 2006. The noted applications are incorporated herein by reference.

This invention relates to fast curing epoxy systems, based on epoxy resins and as curing agent, an adduct derived from the reaction product of an epoxy resin with a mixture of a volatile monoamine and a polyamine, wherein the volatile monoamine is removed off from the reaction mixture after the completion of the reaction, or blends of said adduct with a polyamine and/or a novolac resin.

Curable compositions based on glycidyl compounds and amine hardeners are widely used in the coating industry for protective purposes, for instance to coat metallic and mineral substrates.

The amines used are, in particular, aliphatic, cycloaliphatic, araliphatic or aromatic compounds and imidazoline group-containing polyaminoamides based on mono- or polybasic acids as well as adducts thereof that usually contains a larger amount of remaining amines after the adduction reaction.

These compounds are described in Lee & Neville, Handbook of Epoxy Resins, 1967, chapter 6/1 to 10/19.

Some of the curable epoxy resin compositions using the above mentioned amine hardeners have long curing times. However for certain applications, like marine, a rapid return to service or a shorter manufacture time is desirable. Therefore, very often additives like accelerators, are added, especially in the case of polyamidoamines and polyamino-imidazolines hardeners, to reach an appropriate curing rate. However, most of those systems, despite using accelerators are nevertheless still insufficient compared to the new requirements of cure time for certain applications, as it is the case of marine paints.

Examples of accelerators are tertiary amines, acids, hydroxylamines, Mannich bases and phenols used to accelerate these hardeners. Such accelerators are listed, inter alia, in Lee & Neville, Handbook of Epoxy Resins, 1967, chapter 10, table 10-9.

Also, 2,2-bis(4-hydroxyphenyl)propane (bisphenol A) has been found to be particularly suitable since it additionally improves the early water resistance of the cured thermoset due to its acceleration effect when used as accelerator additive. The accelerator bisphenol A is usually added in an amount of up to 25% based on the hardener.

However, disadvantages have been found to be the high water susceptibility of such formulated hardener. Indeed, when the formulated hardener absorbs minor amounts of water owing to high atmospheric humidity (even of less than 1% water but depending on the proportion of dissolved bisphenol A in the formulated hardener), this results in a crystallisation of bisphenol A as a salt. This is considered to be a major disadvantage, since the hardener can no longer be processed or must be worked up again at great expenditure. Also the addition of 1 to 5% of water are added to the epoxy/hardener system to speed up the ring opening reaction of the epoxy, then the bulk of the dissolved bisphenol A precipitates again in salt form (described in the patent EP 1 040 150 A1).

Another problem, arising from the use of certain type of amines and which is directly linked to its nature, is sometimes the strong carbamation effect (formation of carbamates and surface whitening) especially observed in presence of humidity and at low temperature, when unreacted amines are still present on the surface of the coating during the curing phase. This is especially the case of the amine diethylentriamine (DETA) and its derived adducts that show generally high sensitivity to water and carbon dioxide. These problems could be partially solved by adding for instance bisphenol A to the said DETA adduct in order to accelerate the curing process and minimize the formation of free amine DETA on the surface of the coating; however formulating the hardener with bisphenol A will also introduce possible problems linked to the presence of bisphenol A as mentioned before.

The problems of exudation can be solved sometimes by introducing a non-reactive diluent such as benzylalcohol or phenoxypropanol, at least practically as the diluent should migrate only slowly from the film. It is believed that such diluent introduce hydrophobic properties onto the film surface and can sometimes prevent (to a certain extent) the formation of carbamates. However the addition of benzylalcohol can also affect cure properties of the formulated system and very often prolong it.

Accordingly, it is one object of this invention to provide curable systems, which are capable of overcoming the above mentioned disadvantages.

A first object of the invention are curable compositions comprising
a) an epoxy resin containing on average more than one epoxy group per molecule, and
b) as curing agent a composition comprising
b1) 40-100 wt % of a reaction product from the reaction of
b1a) at least one diglycidylether and/or at least one monoglycidylether with
b1b) a composition comprising a volatile monoamine and a polyamine,
said composition b1b) is used in an amount to provide an excess amino groups relative to epoxy groups from b1a), and whereby the excess of monoamine is removed off from the reaction product,
b2) 0-60 wt % of a polyamine, and
b3) 0-25 wt % of a polyphenol novolac,
and whereby the sum of components b1), b2) and b3) is 100 wt %.

Suitable epoxy compounds a), additionally used according to this invention for the preparation of the curable compositions, are commercially available products containing on average more than one epoxy group per molecule and are saturated or unsaturated linear or branched aliphatic, cycloaliphatic, aromatic or heterocyclic, and may bear substituents which do not materially interfere with the curing reaction.

Examples of epoxy resins suitable for use include that derived from mono- and/or polyhydric and/or polynuclear phenols, especially bisphenols and novolacs. They are diglycidylether of bisphenol A, diglycidylether of bisphenol F and polyglycidyl ethers of polyhydric phenol obtained from the reaction of phenol (or alkylphenols) and aldehydes such as formaldehyde. Polyglycidyl ethers of alcohols, glycols or polyglycols, and polyglycidyl esters of polycarboxylic acids can be used as well.

An extensive enumeration of these compounds is to be found in the compendium "Epoxidverbindungen und Epoxidharze" by A. M. Paquin, Springer Verlag, Berlin, 1958, chapter IV, and in Lee & Neville, "Handbook of Epoxy Resins", 1967, chapter 2, pages 257-307.

It is also possible to use mixtures of two or more than two different epoxy compounds.

The epoxy compounds can be liquid in particular liquid bisphenols or liquid novolacs. Also semi-solid or solid resins of bisphenols or of novolac type and mixtures thereof, can be used as well. Some commercially available solid bisphenol A epoxy resins of type 1 are available from Huntsman under the trade names Araldite® GT 7071 and GT 6071. In case of using semi-solid or solid resins, a solvent is needed to dissolve the epoxy resin and to reduce the viscosity in such a way that the product can be sprayed, as it is the case in marine applications. Additionally also epoxy compounds derived from advancement reactions, for example the advancement of novolacs with bisphenol A can be used as well.

Furthermore, blends of epoxy resins with so-called reactive diluents, e.g. glycidyl ethers of: mono- or polyhydric phenols, mono- or polyhydric aliphatic alcohols, mono- or polyhydric cycloaliphatic alcohols, can be used as well.

Some suitable examples are: cresylglycidyl ether, p-tert.-butyl-phenylglycidyl ether, n-dodecyl-/n-tetradecylglycidyl ether, 1,4-butanedioldiglycidyl ether, 1,6-hexanediol-diglycidyl ether, trimethylolpropanetriglycidyl ether, polyglycidyl ether like polyoxypropylenediglycidyl ether, cyclohexanedimethanoldiglycidyl ether, glycidylester of neodecanoic acid and of cyclohexanedicarboxylic acid.

If necessary, the viscosity of the epoxy resins can be further reduced by adding such reactive diluents and should only be used in reasonable amounts so that the diluents may not adversely affect the end-properties of the thermoset. The epoxy resins and reactive diluent mentioned as examples can be used both for the curable compositions and for the preparation of the amine-epoxy adducts, that may be further blended with a phenolic novolac resin.

In a preferred embodiment of the invention, blends of the epoxy compound a) with reactive diluents are used by pre-mixing the epoxy resin with at least one reactive diluent.

According to the invention, it is preferred to select compound b1a) from diglycidylether of bisphenol A, diglycidylether of bisphenol F, mono-glycidylether of mono-hydric phenols, mono- or diglycidylether of mono- or dihydric cycloaliphatic alcohols, mono- or diglycidylether of mono- or dihydric aliphatic alcohols.

For the component b)—the said curing agent—is used a composition comprising b1) 40-100 wt % of a reaction product from the reaction of b1a) a diglycidyl- and/or monoglycidylether with an excess of amino groups relative to epoxy groups, whereby the excess of amino groups is provided by b1b) a composition in a molar ratio of a volatile monoamine: polyamine from 20:1 mol to 2:1 mol, preferably of from 15:1 mol to 2:1 mol, most preferably of from 10:1 mol to 2:1 mol, and whereby the excess of monoamine is removed off from the reaction product while any unreacted polyamine remains in the composition.

By using an excess of a mixture of mono- and polyamine is understood an excess of amino groups provided from both the at least one or more than one volatile monoamine and the at least one or more than one polyamine relative to epoxy groups provided by the di- or monoglycidylether or mixtures thereof, so that the reaction leads to adducts being practically free of unreacted epoxy groups.

The remaining monoamines are removed from the composition after the formation of the adduct is completed, for example by distillation. The monoamines have preferably a boiling point of under 200° C. at normal pressure. Suitable monoamines are straight or branched aliphatic or cycloaliphatic amines having one amino group bound to an aliphatic or cycloaliphatic residue consisting of 3 to 8, preferably 4 to 6 carbon atoms. Especially preferred is butylamine, in practice an isomer of 1-butylamine, sec.-butylamine or isobutylamine or a mixture thereof. As those isomers of butylamine have boiling points below 80° C. and thus far below the boiling points of the polyamines, an excess of monoamine can easily be removed from the composition by distillation while any excess of polyamine remains in the composition. The boiling point of the used polyamines should be well above of the boiling point of the monoamines and accordingly in practice the boiling points of the mono- and polyamines should be apart sufficiently to remove essentially the volatile monoamines and not, or to a much lesser extend the polyamines. It is considered that the monoamines are removed entirely from the reaction mixture if the content of residual monoamines do not exceed 3 wt % based on final produced adduct b1).

After having removed unreacted monoamine any unreacted excess of polyamine remains in the composition. Suitable amounts of remaining polyamines are from 1 to 30 wt %, preferably 1 to 25 wt %, most preferably from 1 to 20 wt % based on curing agent b1).

A preferred embodiment is also the preparation of an adduct b1) in the presence of standard solvents like e.g. methoxypropanol, 1-butanol, xylene or mixtures thereof usually used in paint formulations. An extensive enumeration of solvents with their chemical, physical and safety data are given in Scheller Solvent-Brevier. After the reaction is completed, the solvent can be either removed by distillation or can be left in the reaction mixture after the monoamines has been distilled off. The in-situ formed adduct can be further formulated with polyamines and/or polyphenol novolacs to give the hardener b1) in a diluted form.

Under polyamines used as part of the mixture with the monoamine are understood amines having at least two amino groups.

The polyamines used according to this invention are aliphatic, cycloaliphatic or aralphatic amines like for example: 1,2-diaminoethane (ethylenediamine (EDA)); 1,2-propanediamine; 1,3-propanediamine; 1,4-diaminobutane; 2,2-dimethyl-1,3-propanediamine (neopentanediamine); diethylaminopropylamine (DEAPA); 2-methyl-1,5-diaminopentane; 1,3-diaminopentane; 2,2,4-Trimethyl-1,6-diaminohexane or 2,4,4-Trimethyl-1,6-diaminohexane and mixtures thereof (TMD); 1-amino-3-aminomethyl-3,5,5-trimethylcyclohexane; 1,3-bis(aminomethyl)-cyclohexane; 1,2-bis(aminomethyl)cyclohexane; hexamethylenediamine (HMD); 1,2- and 1,4-Diaminocyclohexane (1,2-DACH and 1,4-DACH); bis(4-aminocyclohexyl)methane; bis(4-amino-3-methylcyclohexyl)methane; diethylenetriamine (DETA); 4-azaheptane-1,7-diamine; 1,11-diamino-3,6,9-trioxundecane; 1,8-diamino-3,6-dioxaoctane; 1,5-diamino-methyl-3-azapentane; 1,10-diamino-4,7-dioxadecane; Bis(3-aminopropyl)amine; 1,13-diamino-4,7-10 trioxatridecane; 4-aminomethyl-1,8-diaminooctane; 2-butyl-2-ethyl-1,5-diaminopentane; N,N-Bis-(3-aminopropyl)methylamine; triethylenetetramine (TETA); tetraethylenepentamine (TEPA); pentaethylenehexamine (PEHA); Bis(4-amino-3-methylcyclohexyl)methane; m-xylylenediamine (MXDA); 5-(aminomethyl)bicyclo[[2.2.1]hept-2-yl]methylamine (NBDA norbornanediamine); dimethyldipropylenetriamine; dimethylaminopropyl-aminopropylamine (DMAPAPA); 3-aminomethyl-3,5,5-trimethylcyclohexylamine (or isophoronediamine (IPD)); diaminodicyclohexylmethane (PACM); dimethyldiaminodicyclohexylmethane (Laromin C260); 2,2-Bis(4-aminocyclohexyl)propane; bis aminomethyl-dicyclopentadiene (tricyclodecyldiamine (TCD)); imidazoline-group-containing polyaminoamides derived from aliphatic polyethylene polyamines and dimerized or trimerized fatty acids and adducts thereof made from glycidyl compounds.

Further, polyoxyalkylene polyamines, known as Jeffamine®, from Huntsman like D-230, D-400, D-2000, T-403, T-3000, T-5000, ED-600, ED-900, EDR148, XTJ 590 and polyiminoalkylene polyamines, known as Polymin®, can be used as well within the frame of the present invention but the obtained adducts show some less reactivity than those obtained by conventional polyamines.

Further suitable polyamines are 1,14-diamino-4,11-dioxatetradecane; dipropylenetriamine; 2-methyl-1,5-pentanediamine; N,N'-dicyclohexyl-1,6-hexanediamine; N,N'-dimethyl-1,3-diaminopropane; N,N'-diethyl-1,3-diaminopropane; N,N-dimethyl-1,3-diaminopropane; secondary polyoxypropylenedi- and triamine; 2,5-diamino-2,5-dimethylhexane; bis-(amino-methyl)tricyclopentadiene; 1,8-Diamino-p-menthane; Bis-(4-amino-3,5-dimethylcyclohexyl)methane; 1,3-Bis(aminomethyl)cyclohexane (1,3-BAC); dipentylamine. N-2-(aminoethyl)piperazine (N-AEP); N-3-(aminopropyl)piperazine; piperazine.

Preferred polyamines are selected from DETA, MXDA, IPD, TMD, 1,2-DACH and 1,3-BAC.

Using mixtures from several of the above mentioned amines are, as well, possible. Further, while for the purpose for either forming the adduct b1) or as providing the additional component b2) the same amine can be used, it is preferred to use different polyamines or mixtures thereof. Suitable and preferred polyamines as component b2) are nevertheless the same as mentioned within the context of preparation of the adduct b1) described above.

In a further embodiment of the invention the curing agent can—besides component b1)—further comprise the components b2) and/or b3), namely up to 60 wt % of a polyamine or mixtures thereof and/or up to 25 wt % of a polyphenol novolac or mixtures thereof, whereby the sum of components b1), b2) and b3) are 100 wt %.

An advantage of using additionally a polyamine in combination with polyphenol novolac is the reduction of the viscosity while preserving acceptable cure properties. Therefore, it is possible to get formulations with a very high solid content or even solvent free, which makes the said curing agents especially useful for low or even non VOC-applications wherein ecologically regulation requirements must by satisfied.

A disadvantage of using additionally a polyphenol novolac is that the obtained coatings might regain some slight coloration and that the novolac leads usually to an increase of the viscosity of the final hardener blend. Therefore the addition of a polyamine b2) is needed to reduce the viscosity of the hardener blend. It has, however, the disadvantage to bring some brittleness into the film or the coating if compared with the solely used adduct.

In the opposite the addition of polyamine b2) to the adduct has the advantage to reduce the viscosity of final hardener blend. However, it is observed, depending on the type of polyamine used, especially in the case of cycloaliphatic and aliphatic polyamines, some stickiness due to an insufficient curing rate, that is mostly visible at very low temperature application at around 0° C.

Therefore a preferred embodiment of the invention is the combination of b1), b2) and b3) as curing agent b), whereby b) is a composition comprising b1) 40-80, preferably 45-70 wt % of a reaction product from the reaction of b1a) at least one diglycidyl- and/or at least one monoglycidylether with b1b) a composition comprising a volatile monoamine and a polyamine, said composition b1b) is used in an amount to provide an excess amino groups relative to epoxy groups from b1a), and whereby the excess of monoamine is removed off from the reaction product, b2) 15-60, preferably 25-50 wt % of a polyamine, and b3) 5-20, preferably 5-15 wt % of a polyphenol novolac, and whereby the sum of components b1), b2) and b3) is 100 wt %.

The novolacs optionally used in the instant invention as component b3) can be prepared according to well-known processes on reacting formaldehyde or paraformaldehyde with phenolic compounds—such as phenol, methylphenol (cresol), dimethylphenol (xylenol), other alkylphenols, those of bisphenol type, biphenyl type phenols and the like—on using, if required, a catalyst such as oxalic acid. The phenolic compound(s) as well as catalytic amounts of oxalic acid are generally placed in a vessel—with or without solvent or water—and formaldehyde, preferably paraformaldehyde, is added in portions. The volatile components are then removed by distillation under reduced pressure. The novolacs can be made from one or a mixture of different phenolic compounds. Such products are described, inter alia, in Houben-Weyl, 4$^{th}$ edition, *Methoden der Organischen Chemie*, Vol. E 20, Makromolekulare Stoffe, Part 3, pages 1800-1806.

In a preferred embodiment of the invention the polyphenol novolac is a homopolymer resulting from the condensation of a phenolic compound of formula (I) or (II) with formaldehyde (paraformaldehyde) or a copolymer of different phenolic compounds of formula (I) and/or (II) with formaldehyde (paraformaldehyde):

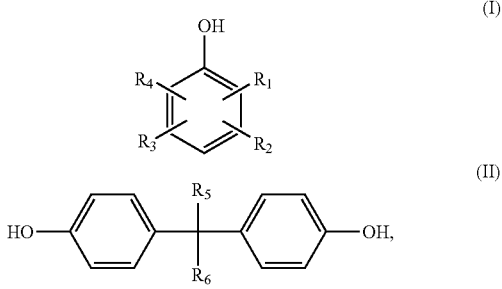

wherein in formula (I) and (II) $R_1$, $R_2$, $R_3$, $R_4$, independently of one another are H, branched or unbranched alkyl radicals containing 1 to 15 carbon atoms, and $R_5$, $R_6$ independently of each other represent H, $CH_3$, $CF_3$.

Preferred novolacs derived from compounds of formula (I) are those, wherein in formula (I) $R_1$, $R_2$, $R_3$, $R_4$ are either H (phenol), or alkylphenols, wherein, while the remaining radicals $R_1$ to $R_4$ are H, one or two of the radicals $R_1$ to $R_4$ are the radical —$CH_3$, or one of the radicals $R_1$ to $R_4$ is a tert-butyl radical, or one of the radicals $R_1$ to $R_4$ is a long-chain branched or unbranched alkyl radical containing 8 to 15 carbon atoms.

Preferred novolacs derived from compounds of formula (II) are those, wherein in formula (II) $R_5$, $R_6$ are both either —H or —$CH_3$.

Very preferred novolacs are those derived from compounds of formula (I), and especially preferred novolacs are those derived from phenol.

The quantity of phenolic resin depends principally on the type of mixture of amines used for component b1) and b2) as well as on the type of phenolic resin used as component b3) to prepare the curing agent and on the targeted viscosity/properties for a given application. To that respect, the viscosity of the curing agent should be preferably lower than 20 000 mPa·s, most preferably below 10 000 mPa·s at ambient temperatures (e.g. of 25° C.). In the case of hardeners having high viscosities or even being semi-solid with high dynamic shear viscosities, it is desirable to add a solvent to the curing agent. Indeed, for spray or brush application and also depending on the spray equipment used (traditional spray equipment or airless twin feed), it is always desirable to add a solvent to final formulation in order to fix the viscosity at a convenient value to make it spray applicable e.g. less than 1000 mPa·s for a traditional spray equipment. Standard solvents, like xylene/butanol mixtures or pure alcohols are commonly used.

Hardeners and epoxy compounds are preferably used in about equivalent amounts, i.e. based on active hydrogens bound to amino nitrogen atoms and reactive epoxy groups. However, it is also possible to use the hardener or epoxy component in more or in less than the equivalent amount. The amounts used depend on the desired final properties of the formed coating.

The epoxy resin composition can optionally further include other commonly used additives selected for example from flow control additives, antifoaming agents, anti-sag agents, pigments, reinforcing agents, fillers, elastomers, stabilizers, extenders, plasticizers, flame retardants, accelerators, colorants, fibrous substances, thixotropic agents, and anti-corrosive pigments.

As already mentioned accelerators in catalytic amounts for epoxy/amine reactions can be used in addition to the new curing agents. Suitable examples are for instance Mannich base type accelerators like Accelerators 2950 and 960-1 from Huntsman Advanced Materials, tertiary amines like benzyldimethylamine (BDMA), metal salts like hydroxides and nitrates most known those of group I and group II metals such as calcium, lithium etc. as described in EP 0 083 813 A1 and EP 0 471 988 A1, or acids like salicylic acid can be added as well. The amount of accelerator is from 0.1 to 10, preferably from 0.3 to 5, more preferably from 0.5 to 3% per weight based on the total weight of components b1), b2), b3) and accelerator.

Like mentioned before, bisphenol A could be added as well in catalytic amounts to the hardener blend in order to accelerate the curing reaction with although taking attention to the possibility of an eventual precipitation of this component.

The epoxy composition described herein can be used for coating, adhesive, flooring, casting, tooling or encapsulating, to name a few applications. The epoxy compositions have particularly good applicability for coatings, especially when combined with pigments. The epoxy compositions using the novel hybrid hardeners described above can for example advantageously be combined with an anti-corrosive pigment like zinc phosphate or zinc powder to produce paint formulations having high corrosion resistance for marine and heavy duty applications. Furthermore the compositions can also include pigments like iron oxide and titanium dioxide and a filler like barium sulfate, to give protective coatings for tanks and pipes. The resulting formulations can be applied on at least one surface of the substrate to be coated in conventional manner by spraying, roller coating, brushing etc. or with special equipments like a twin-feed spray equipment and the like, depending on the gel time of the system.

For the inventive combinations of epoxy resin and specific curing agent, it was surprisingly observed that a extended pot life of about 40 min was obtained if compared to a system comprising an adduct made from the reaction of a glycidyl compound and diethylenediamine (DETA) including bisphenol A as accelerator (commercial hardener Aradur® 943), while otherwise a fast cure speed remained. Depending on the polyamine used for the preparation of the adduct b1b) the pot life can be even more extended, for instance if the polyamine used is m-xylylenediamine (MXDA), the pot life reaches then almost 70 min. Full cure times of the cited examples are equal or less than 10 hours at 5° C. and achieved in absence of solvents, and thus being as fast or even faster than cure times obtained by using phenalkamines (alkylated phenolic polyamines), that are known for providing fast cure times at low temperatures with a workable pot life. Further advantages of the inventive curing agent if compared to phenalkamines, are minor or no coloration and a good yellowing resistance of the obtained coatings when made with the isolated adduct solely formulated.

A further advantage is that the said inventive curing agents show much less exudation problems than conventional adducts for instance made with DETA. It is also worth mentioning that for large scale production most of the used monoamine can be recycled if being distilled off after the production step of forming the adduct.

The mentioned properties of providing long pot life combined with fast cure times at low temperatures make the inventive systems especially useful for marine and offshore coatings, industrial maintenance, construction, tank and pipe linings, adhesive, laminates, composites, and electrical potting applications.

EXAMPLES

Example A [Curing Agent b)=b1)]

An Isolated Adduct A Based on the Reaction Product of an Epoxy Resin with the Amine Mixture The isolated adduct A was prepared using following procedure:

144.2 g diethylenetriamine (1.4 mol) was mixed together with 510.8 g butyl amine (7.0 mol) in a reaction vessel at room temperature. The reaction vessel is purged for a few minutes with nitrogen. Then, the temperature was increased to 65° C. and 262.2 g Araldite® GY 260 (diglycidyl ether of bisphenol A (DGEBA), Epoxy Equivalent Weight (EEW) of 187, 1.4 equivalent) was added dropwise to the amine mixture within ca. 120 minutes at 60° C. under stirring. The reaction mixture is kept for half an hour at this temperature. Then, the excess of butyl amine is distilled off at the rotavapor at 75° C. under a vacuum of 30 mbar. Additionally the reaction mixture is stripped with nitrogen and under high vacuum of less than 1 mbar during 30 minutes at a temperature of 75° C. It was obtained 460.7 g of amine adduct A with a viscosity of 14200 mPa·s (measured by CAP 2000, cone 6, 500 rpm at 25° C.) and a calculated hydrogen equivalent weight of 65.1. The calculated free amine DETA content is of about 16.6 wt % percentage based on isolated adduct A.

Example B [Curing Agent b)=b1), b2) and b3)]

Preparation of the Blend B Containing the Isolated Adduct A, 1,2-diaminocyclohexane (1,2-DACH) and Phenol Novolac (Supraplast 3616)

The isolated adduct A of example A was further mixed with the phenolic novolac Supraplast 3616 and 1,2-diaminocyclohexane (1,2-DACH) to give the blend product B, which composition and characteristics are given in table 1. The obtained blend B has a calculated hydrogen equivalent weight of 45.8.

TABLE 1

Composition and characteristics of the hardener blend B

|  | Hardener blend B |
|---|---|
| Isolated adduct A | 50 |
| 1,2-DACH[1)] | 40 |
| Supraplast 3616 | 10 |
| Viscosity[2)] of hardener at 25° C. (mPa · s) | 950 |

[1)]1,2-DACH = 1,2-diaminocylohexane;
[2)]Viscosity of the formulation was determined at 25° C. using a CAP 2000 viscosimeter (ISO 3219) with cone 3 at 500 rpm.

Example C [Curing Agent b)=b1), b2) and b3)]

Preparation of the Blend C Made with the Isolated Adduct A, 1,2-diaminocyclohexane (1,2-DACH) and Phenol Novolac (Supraplast 3616)

The isolated adduct A of example A was further mixed with Supraplast 3616 and 1,2-diaminocyclohexane (1,2-DACH) to give the blend product C, which composition and characteristics are given in table 2. The obtained blend C has a calculated hydrogen equivalent weight of 50.3.

TABLE 2

Composition and characteristics of the hardener blend C

|  | Hardener blend C |
|---|---|
| Isolated adduct A | 60 |
| 1,2-DACH[1)] | 30 |
| Supraplast 3616 | 10 |
| Viscosity[2)] of hardener at 25° C. (mPa · s) | 2600 |

[1)]1,2-DACH = 1,2-diaminocylohexane;
[2)]Viscosity of the formulation was determined at 25° C. using a CAP 2000 viscosimeter (ISO 3219) with cone 3 at 500 rpm.

Example D [Curing Agent b)=b1)]

An Isolated Adduct D Based on the Reaction Product of an Epoxy Resin with the Amine Mixture The isolated adduct D was prepared using following procedure:

231.54 g metaxylylenediamine (1.7 mol) was mixed together with 730 g butyl amine (10.0 mol) in a reaction vessel at room temperature. The reaction vessel is purged for a few minutes with nitrogen. Then, the temperature was increased to 70° C. and a mixture of 262.2 g Araldite® GY 260 (diglycidyl ether of bisphenol A (DGEBA), EEW 187, 1.4 equivalent) and 54.55 g Araldite® K (cresyl monoglycidylether, EEW 182, 0.30 equivalent) was added dropwise to the amine mixture within ca. 120 minutes at 70° C. under stirring. The reaction mixture is kept for half an hour at this temperature. Then, the excess of butyl amine is distilled off at the rotavapor at 75° C. under a vacuum of 30 mbar. Additionally the reaction mixture is stripped with nitrogen and under high vacuum of less than 1 mbar during 30 minutes at a temperature of 75° C. It was obtained 643.4 g of amine adduct D with a viscosity of 3140 mPa·s (measured by CAP 2000, cone 3, 50 rpm, at 25° C.) and a calculated hydrogen equivalent weight of 62.5. The calculated free amine MXDA content is of about 25.1 wt % percentage based on isolated adduct D.

Example E [Curing Agent b)=b1)]

An Isolated Adduct E Based on the Reaction Product of an Epoxy Resin with the Amine Mixture The isolated adduct E was prepared using following procedure:

206 g diethylenetriamine (2 mol) was mixed together with 730 g butyl amine (10.0 mol) in a reaction vessel at room temperature. The reaction vessel is purged for a few minutes with nitrogen. Then, the temperature was increased to 75° C. and a mixture of 262.7 g Araldite® GY 260 (diglycidyl ether of bisphenol A (DGEBA), EEW 187, 1.4 equivalent) and 46.51 g Araldite® DY-397 (butanediol diglycidylether, EEW 114, 0.4 equivalent) was added dropwise to the amine mixture within ca. 120 minutes at 75° C. under stirring. The reaction mixture is kept for half an hour at this temperature. Then, the excess of butyl amine is distilled off at the rotavapor at 75° C. under a vacuum of 30 mbar. Additionally the reaction mixture is stripped with nitrogen and under high vacuum of less than 1 mbar during 30 minutes at a temperature of 75° C. It was obtained 599.3 g of amine adduct E with a viscosity of 2800 mPa·s (measured by CAP 2000, cone 3, 50 rpm, at 25° C.) and a calculated hydrogen equivalent weight of 57.1. The calculated free amine DETA content is of about 19.8 wt % percentage based on isolated adduct E.

Example F [Curing Agent b)=b1)]

An Isolated Adduct F Based on the Reaction Product of an Epoxy Resin with the Amine Mixture The isolated adduct F was prepared using following procedure:

206 g diethylenetriamine (2 mol) was mixed together with 365 g butyl amine (5.0 mol) in a reaction vessel at room temperature. The reaction vessel is purged for a few minutes with nitrogen. Then, the temperature was increased to 75° C. and a mixture of 262.7 g Araldite® GY 260 (diglycidyl ether of bisphenol A (DGEBA), EEW 187, 1.4 equivalent) and 46.51 g Araldite® DY-397 (butanediol diglycidylether, EEW 114, 0.4 equivalent) was added dropwise to the amine mixture within ca. 150 minutes at 75° C. under stirring. The reaction mixture is kept for half an hour at this temperature. Then, the excess of butyl amine is distilled off at the rotavapor at 75° C. under a vacuum of 30 mbar. Additionally the reaction mixture is stripped with nitrogen and under high vacuum of less than 1 mbar during 30 minutes at a temperature of 75° C. It was obtained 572.5 g of amine adduct F with a viscosity of 8570 mPa·s (measured by CAP 2000, cone 6, 50 rpm, at 25° C.) and a calculated hydrogen equivalent weight of 58.6. The calculated free amine DETA content is of about 14.1 wt % percentage based on isolated adduct F.

USE EXAMPLES

Example 1

Comparison of Cure Properties and Mechanical Properties of the Isolated Adduct A with the Commercial Hardener Aradur 943

The cure properties of hardener A in combination with epoxy resin Araldite GY 250 (diglycidyl ether of bisphenol A, EEW 186) were compared to those of Aradur® 943 combined with GY 250. The results of cure times, which were determined at different temperatures of 0° C., 5° C. and 23° C., are given in table 3. Also the cure properties of an adduct Aradur 943 based on the reaction product of DETA (diethylenetriamine) with a liquid epoxy resin containing bisphenol A as accelerator are compared in table 3 as well.

The results of cure properties, for instance the full cure time, show that both hardeners have similar full cure times, the full cure time being for accelerated adduct DETA-GY 260 (Aradur 943) 5 hours and 7.5 h for the inventive adduct A. However, the dust free times are much longer for the comparative fast hardener Aradur 943 of about 6 hours at 23° C. and almost of more than 24 hours at 5° C. compared to the inventive hardener A (isolated adduct A). It was surprising to see at this stage that such isolated adduct A, which exhibits as well fast curing properties practically comparable to hardener Aradur 943, also has a long pot life of almost 40 minutes compared to 14 minutes for the hardener Aradur 943. This commercial hardener is essentially used for low temperature cure application, for instance where corrosion protection under severe conditions is desired. Due to its high reactivity and short pot life of less than 15 minutes when combined with Araldite GY 250, it needs however a two component spray equipment for its application.

TABLE 3

Cure properties of the formulated system containing isolated adduct A

| Formulation | 1 | Comparative 1 |
|---|---|---|
| Epoxy resin[1] | 74.51 | 83.04 |
| Isolated adduct A[2] | 25.49 | — |
| Aradur 943[3] | — | 16.96 |
| Viscosity of formulation at 25° C.[4] | 12160 | 8640 |
| Pot life for 100 g (minutes)[5] | 40 | 14 |
| Full cure at 0° C./80% r.h. (hours)[6] | 9 | 8 |
| Dust free at 0° C./80% r.h. (hours)[7] | >24 | >24 |
| Full cure at 5° C./55% r.h. (hours)[6] | 7.5 | 5 |
| Dust free at 5° C./55% r.h. (hours)[7] | 11 | >24 |
| Full cure at 23° C./50% r.h. (hours)[6] | 3 | 2 |
| Dust free at 23° C./50% r.h. (hours)[7] | 3 | 6 |

[1] Araldite GY 250 with EEW of 186 in wt %
[2] in wt %
[3] Aradur 943 available from Huntsman Advanced Materials
[4] Viscosity of the formulation was determined at 25° C. using a CAP 2000 viscosimeter (ISO 3219) with cone 6 at 500 rpm
[5] Pot life was measured by Tecam/Techne for 100 g formulation at 23° C. British standard BS 3532
[6)7)] the cure times were measured on Landolt equipment using glass sheets coated with the above formulations. To determine the full cure, a needle is continuously moving forward on the coated glass sheet during exactly 24 h; the full cure is determined by measuring the distance/time where the needle, penetrating the film, comes out from the film. To determine dust free time, sand is continuously added to the coating surface; the dust free time is measured by removing the sand from the coating surface and measuring the distance/time where sand sticks on the coating surface. The coating thickness measured on glass was between 250-300 microns.

The table 4 below gives the hardness in Persoz (sec) in function of the cure times, at different cure temperatures for the formulation 1 and comparative example 1.

TABLE 4

The hardness in Persoz of the inventive hardener compared with Aradur 943

| Persoz hardness values[1] for formulation (sec) | 1 | Comparative 1 |
|---|---|---|
| after 1 day (d) at 0° C./80% rh | 8 | 9 |
| 7 d at 0° C./80% r.h. | 30 | 25 |
| 14 d at 0° C./80% r.h. | 114 | 39 |
| after 1 day (d) at 5° C./55% r.h. | 45 | 28 |
| 7 d at 5° C./55% r.h. | 216 | 205 |
| 14 d at 5° C./55% r.h. | 246 | 232 |
| after 1 day (d) at 23° C./50% r.h. | 245 | 325 |
| 7 d at 23° C./50% r.h. | 254 | 374 |
| 14 d at 23° C./50% r.h. | 316 | 380 |

[1] Persoz hardness was measured on glass sheets coated with the above formulations using a Byk pendulum hardness tester (ISO 1522). The coating thickness measured on glass was between 250-300 microns.

Example 2

Cure Properties and Mechanical Properties of Hardeners B and C Compared to Hardener Aradur 943

The cure properties of hardeners B and C were compared to those of Aradur 943 as well using the epoxy resin GY 250. The results of cure times, which were determined at different temperatures 0° C., 5° C. and 23° C., are given in table 5. The full cure times of the blend hardeners are somewhat prolonged by the addition of 1,2-diaminocyclohexane and supraplast 3616 compared to the pure isolated adduct A in formulation 1 and compared to Aradur 943. However the dust free time here again was reduced by the modification of the system with supraplast 3616 compared to the Aradur 943 and also the viscosity of the formulation is reduced compared to formulation 1 and comparative 1. The hardness increase in function of the time is as good as for Aradur 943 and the isolated adduct A.

The mechanical properties (the Erichsen film distensibility, film impact resistance and film bending resistance) of hardeners A, B and C were determined as well. The results are given in table 7 below. The isolated adduct A exhibits a better mechanical resistance than the two other products B and C as it can be seen from low erichsen, impact and bending values. However, depending on the targed properties, the blends B and C are interesting hardeners since they exhibit much lower formulation viscosities and therefore they can be applied even solvent free.

TABLE 5

Cure properties of blend adduct A/1,2-DACH/Supraplast 3616

| Formulation | 2 | 3 | Comparative 1 |
|---|---|---|---|
| Epoxy resin[1] | 80.31 | 78.79 | 83.04 |
| Hardener blend B[2] | 19.69 | — | — |
| Hardener blend C[3] | — | 21.21 | — |
| Aradur 943 | — | — | 16.96 |
| Viscosity of formulation at 25° C.[4] | 5500 | 7000 | 8640 |
| Pot life for 100 g (minutes)[5] | 43 | 37 | 14 |
| Full cure at 0° C./80% r.h. (hours)[6] | 13 | 12 | 8 |
| Dust free at 0° C./80% r.h. (hours)[7] | >24 | >24 | >24 |
| Full cure at 5° C./55% r.h. (hours)[6] | 10 | 9 | 5 |
| Dust free at 5° C./55% r.h. (hours)[7] | 10 | 10 | >24 |

TABLE 5-continued

Cure properties of blend adduct A/1,2-DACH/Supraplast 3616

| Formulation | 2 | 3 | Comparative 1 |
|---|---|---|---|
| Full cure at 23° C./50% r.h (hours)[6] | 3 | 3 | 2 |
| Dust free at 23° C./50% r.h (hours)[7] | 5 | 4 | 6 |

[1] Araldite GY 250 with EEW of 186 in wt %
[2] in wt %
[3] in wt
[4] Viscosity of the formulation was determined at 25° C. using a CAP 2000 viscosimeter (ISO 3219) with cone 6 at 500 rpm
[5] Pot life was measured by Tecam/Techne for 100 g formulation at 23° C. British standard BS 3532
[6][7] the cure times were measured on Landolt equipment using glass sheets coated with the above formulations The coating thickness measured on glass was between 250-300 microns.

TABLE 6

Hardness (in Persoz) of the film in function of cure time at different temperatures

| Formulation | 2 | 3 | Comparative 1 |
|---|---|---|---|
| Persoz hardness in [s][1] | | | |
| after 1 day at 0° C./80% r.h. | 5 | 7 | 9 |
| after 1 week at 0° C./80% r.h. | 80 | 82 | 25 |
| after 2 weeks at 0° C./80% r.h. | 176 | 188 | 39 |
| after 1 day at 5° C./55% r.h. | 27 | 35 | 28 |
| after 1 week at 5° C./55% r.h. | 164 | 204 | 205 |
| after 2 weeks at 5° C./55% r.h. | 265 | 284 | 232 |
| after 1 day at 23° C./50% r.h. | 320 | 198 | 325 |
| after 1 week at 23° C./50% r.h. | 354 | 321 | 374 |
| after 2 weeks at 23° C./50% r.h. | 358 | 359 | 380 |

[1] Persoz hardness was measured with a Byk pendulum hardness tester (ISO 1522). Coating thickness measured on glass was between 250-300 microns.

TABLE 7

Mechanical test results of formulations cured at different temperatures comprising hardeners B and C compared to the isolated adduct A

| Formulation | 1 | 2 | 3 |
|---|---|---|---|
| Erichsen[1] | | | |
| After 1 week at 23° C./50% r.h. | 2.8 | 0.2 | 0.1 |
| After 2 weeks at 23° C./50% r.h. | 2.2 | 0.2 | 0.3 |
| After 4 weeks at 23° C./50% r.h. | 1.8 | 0.2 | 0.3 |
| Direct impact deformation[2] | | | |
| After 1 week at 23° C./50% r.h. | >50 < 60 | <10 | <10 |
| After 2 weeks at 23° C./50% r.h. | >50 < 60 | <10 | <10 |
| After 4 weeks at 23° C./50% r.h. | >40 < 50 | <10 | <10 |
| Mandrel bending[3] | | | |
| After 1 week at 23° C./50% r.h. | 70 | <10 | <10 |
| After 2 weeks at 23° C./50% r.h. | 70 | 5 | 10 |
| After 4 weeks at 23° C./50% r.h. | 65 | 15 | 15 |

The coating thickness measured on degreased steel panels was between 250-300 microns.
[1] Erichsen indentation test was measured on Erichsen instrumentation, a standard method for measuring the elasticity of film. In this test, a sphere is pressed from the backside against the panel. The level of indentation before cracking is measured in mm (ISO 1520/DIN 53156).
[2] Impact deformation (direct impact) is determined by dropping a punch having a weight of 2 Kg, on the underside of which there is a sphere of 20 mm in diameter, directly onto the coated surface from a certain height, underside down. The value given is the product of the weight of the punch in Kg and the maximum test height in cm at which no damage to the coating can be found in cm · Kg (ISO 6272).
[3] Bend test round a cylindrical mandrel with diameter of 15 mm under standard conditions. It is an empirical test procedure for assessing the resistance of a coating to cracking and/or detachment from the metal when subjected to bending round a cylindrical mandrel under standard conditions. The values are given in degree (ISO 1519/DIN 53152).

Example 3

Cure and Mechanical Properties of Hardeners D, E, F Compared to Hardener Aradur 943

The cure properties of hardeners isolated adducts D, E and F were compared to those of commercial Aradur 943 in combination with epoxy resin GY 250. The results of cure times, which were determined at different temperatures 0° C., 5° C. and 23° C., are given in table 8. All three adducts show better dust free times than the commercial system with Aradur 943 especially visible at 5° and 23° C.

TABLE 8

Cure properties of blend adduct A/1,2-DACH/Supraplast 3616

| Formulation | 4 | 5 | 6 | Comparative 1 |
|---|---|---|---|---|
| Epoxy resin[1] | 74.87 | 76.82 | 76.04 | 83.04 |
| Isolated adduct D[2] | 25.13 | — | — | — |
| Isolated adduct E[3] | — | 23.18 | — | — |
| Isolated adduct F[4] | — | — | 23.96 | — |
| Aradur 943 | | | | 16.96 |
| Viscosity of formulation at 25° C.[5] | 6720 | 6080 | 11520 | 8640 |
| Pot life for 100 g (minutes)[6] | 70 | 35 | 33 | 14 |
| Full cure at 0° C./80% r.h. (hours)[7] | 12 | 13 | 11 | 8 |
| Dust free at 0° C./80% r.h. (hours)[8] | 4 | >24 | >24 | >24 |
| Full cure at 5° C./55% r.h. (hours)[7] | 10 | 8 | 8 | 5 |
| Dust free at 5° C./55% r.h. (hours)[8] | 2.5 | 10 | 13 | >24 |
| Full cure at 23° C./50% r.h (hours)[7] | 4 | 3 | 2.5 | 2 |
| Dust free at 23° C./50% r.h (hours)[5] | 3 | 4 | 3.5 | 6 |

[1] Araldite GY 250 with EEW of 186 in wt %
[2] in wt %
[3] in wt %
[4] in wt %
[5] Viscosity of the formulation was determined at 25° C. using a CAP 2000 viscosimeter (ISO 3219) with cone 6 at 500 rpm
[6] Pot life was measured by Tecam/Techne for 100 g.
[7][8] The cure times were measured on landoldt equipment using glass sheets coated with the above formulations Also the coating hardness build up of the three adducts D, E and F is comparable to this of the commercial system Aradur 943, which means that the different systems are curing as fast as Aradur 943 (table 9). Here again it was observed that the pot lifes of all three adducts D, E and F are surprisingly much longer than this of the commercial Aradur 943 system. The final hardness of the coatings prepared with hardeners adducts E or F based on DY 0397 (butanediol diglycidylether) have the lowest final hardness after two weeks cure at 23° C. when compared to Aradur 943 and isolated adduct D.

TABLE 9

Hardness (in Persoz) of the film in function of cure time at different temperatures

| Formulation | 4 | 5 | 6 | Comparative 1 |
|---|---|---|---|---|
| Persoz hardness in [s][1] | | | | |
| after 1 day at 0° C./80% r.h. | 8 | 7 | 10 | 9 |
| after 1 week at 0° C./80% r.h. | 67 | 86 | 36 | 25 |
| after 2 weeks at 0° C./80% r.h. | 220 | 116 | 44 | 39 |
| after 1 day at 5° C./55% r.h. | 23 | 27 | 33 | 28 |
| after 1 week at 5° C./55% r.h. | 283 | 240 | 127 | 205 |

TABLE 9-continued

Hardness (in Persoz) of the film in function of cure time at different temperatures

| Formulation | 4 | 5 | 6 | Comparative 1 |
|---|---|---|---|---|
| after 2 weeks at 5° C./55% r.h. | 301 | 242 | 209 | 232 |
| after 1 day at 23° C./50% r.h. | 367 | 263 | 253 | 325 |
| after 1 week at 23° C./50% r.h. | 397 | 294 | 273 | 374 |
| after 2 weeks at 23° C./50% r.h. | 395 | 295 | 285 | 380 |

[1]Persoz hardness was measured with a Byk pendulum hardness tester (ISO 1522). Coating thickness measured on glass was between 250-300 micron Example 4

Corrosion Resistance of Isolated Adduct A and Blend B

The corrosion resistance was measured following DIN 35167 and DIN 50021-SS, the salt spray test. The adduct A and blend B were both formulated as an anticorrosive primer as given in tables 10 and 11 and applied with a spray gun on sand blasted steel panels Sa $2^{1/2}$ (100 mm×70 mm) at thicknesses of 160 μm. The coated panels were allowed to cure during 7 days at 23° C./50% r.h. After this time the coated panels were scribed in X-shape with the Scratch Stylus 463 from Erichsen, each leg being approximately 5 cm in length. The panels were then exposed to salt spray during different times for instance 500 h, 1000 h, 2000 h and 4000 h.

TABLE 10

Anticorrosive primer formulation with isolated adduct A of example A

| Primer formulation | Parts by weight |
|---|---|
| Araldite GY 250/Modifier DW1765 [98:2] | 85.1 |
| Luvotix P 25 X (thickener) | 8.1 |
| ZP 10 (Zinc phosphate) | 22.5 |
| Talc 10 MO | 75.3 |
| Iron oxide 130 | 14.85 |
| BaSO$_4$ EWO S | 30.1 |
| Isolated adduct A | 29.1 |
| Xylene-butanol 1:4 | (Mixture diluted to approx 1000 mPa · s) |

Araldite GY 250 was mixed with modifier DW 1765 (a paste based on liquid epoxy resin from Huntsman Advanced Materials) in the weight proportion of 98:2
Luvotix P 25 X is a thixotropic agent (Lehmann&Voss&Co); Zinc phosphate ZP 10 (Heubach GmbH)
Talc 10 MO (Talc de Luzenac France); Barium sulfate EWO ®-S (Sachtleben Chemie GmbH)
Iron oxide red 130 (BAYER)

TABLE 11

Anticorrosive primer formulation with blend B of example B

| Primer formulation | Parts by weight |
|---|---|
| Araldite GY 250/Modifier DW1765 [98:2] | 85.1 |
| Luvotix P 25 X (thickener) | 8.1 |
| ZP 10 (Zinc phosphate) | 22.5 |
| Talc 10 MO | 75.3 |
| Iron oxide 130 | 14.85 |
| BaSO$_4$ EWO S | 30.1 |
| Blend B | 20.9 |
| Xylene-butanol 1:4 | (Mixture diluted to approx 1000 mPa · s) |

The results of the corrosion test in the case of the adduct A and blend B are given in table 12. The value $W_A$ in formula I depends on the undercoat corrosion area created during the exposure time. As higher this value becomes, as worse is the corrosion resistance of the coating. In the present case, minimal undercoat corrosion was observed during an exposure time of almost 4000 h.

$$W_A = \frac{A_1 - A_0}{2} \cdot \frac{1}{L} \quad \text{Formula (I)}$$

$A_1$=Total surface of the under corrosion zone in mm$^2$
$A_0$=Surface of the scrubbed line in mm$^2$; L=Length of the scrubbed line in mm

TABLE 12

$W_A$ value obtained at different corrosion times for the isolated adduct A and the blend B

| | Exposure time | | | |
|---|---|---|---|---|
| System | 500 h | 1000 h | 2000 h | 4000 h |
| Isolated adduct A/GY 250 - DW1765 160 μm - WA | 0 | 12 | 18 | 19 |
| Isolated adduct A/GY 250 - DW1765 160 μm corroded surface mm$^2$ | 0 | 241 | 361 | 393 |
| Blend B/GY 250 - DW1765 160 μm - $W_A$ | 4 | 9 | 16 | 17 |
| Blend B/GY 250 - DW1765 160 μm corroded surface mm$^2$ | 99 | 182 | 325 | 357 |

$A_0$=Surface of the scrubbed line in mm$^2$=10×1 mm$^2$
L=Length of the scrubbed line in mm=10 mm The coatings made with adduct A and blend B show equivalent and good resistance to corrosion and both can be further used in primer formulation for instance for marine and heavy duty application.

The invention claimed is:

1. A curable composition comprising
    a) an epoxy resin containing on average more than one epoxy group per molecule, and
    b) as curing agent a composition comprising
        b1) 40-100 wt % of a reaction product from the reaction of
        b1a) at least one diglycidyl- and/or at least one monoglycidylether with
        b1b) a composition comprising a volatile monoamine and a polyamine,
        said composition b1b) is used in an amount to provide an excess amino groups relative to epoxy groups from b1a), and whereby the excess of monoamine is removed off from the reaction product,
        b2) 0-60 wt % of a polyamine, and
        b3) 0-25 wt % of a polyphenol novolac,
    and whereby the sum of components b1), b2) and b3) is 100 wt %.

2. A composition according to claim 1, whereby b) is a composition comprising
    b1) 40-80 wt % of a reaction product from the reaction of
    b1a) at least one diglycidyl- and/or at least one monoglycidylether with
    b1b) a composition comprising a volatile monoamine and a polyamine,
    said composition b1b) is used in an amount to provide an excess amino groups relative to epoxy groups from b1a), and whereby the excess of monoamine is removed off from the reaction product,
    b2) 15-60 wt % of a polyamine, and
    b3) 5-20 wt % of a polyphenol novolac, and whereby the sum of components b1), b2) and b3) is 100 wt %.

3. A composition according to claim 1, wherein component a) is selected from the group consisting of diglycidylether of bisphenol A, diglycidylether of bisphenol F, diglycidylether of dihydric cycloaliphatic alcohols, and diglycidylether of dihydric aliphatic alcohols.

4. A composition according to claim 1, wherein component a) is premixed with a reactive diluent.

5. A composition according to claim 1, wherein component b1a) is selected from the group consisting of diglycidylether of bisphenol A, diglycidylether of bisphenol F, polyglycidylether of polyhydric phenol or cresol novolacs, mono- or polyglycidylether of mono- or polyhydric cycloaliphatic alcohols, and mono- or polyglycidylether of mono- or polyhydric aliphatic alcohols.

6. A composition according to claim 1, wherein the polyamine of component b1b) or b2) is selected from the group consisting of m-xylylenediamine, isophoronediamine, trimethylhexamethylenediamine, 1,2-diaminocyclohexane, 1,3-bis(aminomethyl)-cyclohexane, diethylenetetriamine, and diaminodicyclohexylmethane.

7. A composition according to claim 1, wherein the polyphenol novolac is a homopolymer resulting from the condensation of phenolic compounds of formula (I) or (II) with formaldehyde or a copolymer of different phenolic compounds of formula (I) and/or (II) with formaldehyde:

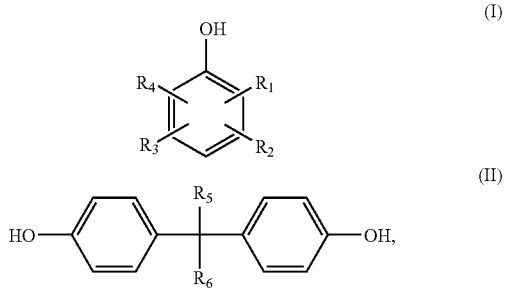

wherein in formula (I) and (II) $R_1$, $R_2$, $R_3$, $R_4$, independently of one another are H, branched or unbranched alkyl radicals containing 1 to 15 carbon atoms, and $R_5$, $R_6$ independently of each other represent H, $CH_3$, or $CF_3$.

8. A composition according to claim 7, wherein the polyphenol novolac comprises unreacted free phenolic compounds of formula (I) and/or (II), in an amount of no more than 10% by weight, based on the total weight of the blend b).

9. A composition according to claim 1, wherein component b1) is made in the presence of a solvent.

10. A composition according to claim 1, which in addition comprises inorganic and/or organic additives selected from the group consisting of flow control additives, antifoaming agents, anti-sag agents, pigments, reinforcing agents, fillers, elastomers, stabilizers, extenders, plasticizers, flame retardants, accelerators, colorants, fibrous substances, thixotropic agents, and anti-corrosive pigments.

11. A composition according to claim 10, whereby as additive salicylic acid is used.

12. A cured material, obtained from curing a composition comprising
a) an epoxy resin containing on average more than one epoxy group per molecule, and
b) as curing agent a composition comprising
b1) 40-100 wt % of a reaction product from the reaction of
b1a) at least one diglycidyl- and/or at least one monoglycidylether with
b1b) a composition comprising a volatile monoamine and a polyamine,
said composition b1b) is used in an amount to provide an excess amino groups relative to epoxy groups from b1a), and whereby the excess of monoamine is removed off from the reaction product,
b2) 0-60 wt % of a polyamine, and
b3) 0-25 wt % of a polyphenol novolac,
and whereby the sum of components b1), b2) and b3) is 100 wt %.

* * * * *